United States Patent
Shillabeer

(10) Patent No.: US 10,792,774 B2
(45) Date of Patent: Oct. 6, 2020

(54) CLAMP FOR HOLDING A WORKPIECE FOR MACHINING

(71) Applicant: Timothy Robert Shillabeer, Leicester (GB)

(72) Inventor: Timothy Robert Shillabeer, Leicester (GB)

(*) Notice: Subject to any disclaimer, the term of this patent is extended or adjusted under 35 U.S.C. 154(b) by 343 days.

(21) Appl. No.: 15/777,363

(22) PCT Filed: Nov. 21, 2016

(86) PCT No.: PCT/GB2016/053623
§ 371 (c)(1),
(2) Date: May 18, 2018

(87) PCT Pub. No.: WO2017/089750
PCT Pub. Date: Jun. 1, 2017

(65) Prior Publication Data
US 2020/0206853 A1    Jul. 2, 2020

(30) Foreign Application Priority Data

Nov. 24, 2015  (GB) .................................. 1520713.7

(51) Int. Cl.
| | |
|---|---|
| B25B 5/00 | (2006.01) |
| B25B 5/10 | (2006.01) |
| B25B 5/16 | (2006.01) |
| B23Q 3/06 | (2006.01) |

(52) U.S. Cl.
CPC ................ *B23Q 3/06* (2013.01); *B25B 5/003* (2013.01); *B25B 5/006* (2013.01); *B25B 5/10* (2013.01); *B25B 5/16* (2013.01)

(58) Field of Classification Search
CPC .......... B25B 1/20; B25B 1/24; B25B 1/2405; B25B 1/241; B25B 1/2415; B25B 1/2421; B25B 1/2452; B25B 1/2457; B25B 1/2463; B25B 5/14; B25B 5/145; B25B 5/142; B25B 5/16; B25B 5/163
See application file for complete search history.

(56) References Cited

FOREIGN PATENT DOCUMENTS

| | | | |
|---|---|---|---|
| CH | 104942616 A | | 9/2015 |
| CN | 102603199 A | * | 7/2012 |
| CN | 102603199 A | | 7/2012 |
| JP | 200148684 A | | 2/2001 |
| TW | 201524641 A | | 7/2015 |

OTHER PUBLICATIONS

Translation of CN102603199A (Year: 2012).*
UKIPO, Search Report for GB Patent Application No. GB1520713.7, dated Mar. 29, 2016.

* cited by examiner

*Primary Examiner* — Tyrone V Hall, Jr.
*Assistant Examiner* — Abbie E Quann
(74) *Attorney, Agent, or Firm* — NK Patent Law

(57) ABSTRACT

The present invention provides a clamp for holding a workpiece that is particularly suitable for use in CNC machining. The clamp is particularly useful for use in picture-frame machining techniques as it allows a workpiece to be held in a position wherein a machine can have substantially unencumbered access to both sides of the workpiece without the need to remove the workpiece from the clamp. The clamp comprises a frame comprising a base, a first arm, and a second arm, the first arm and the second arm each mounted to the base at an inner end such that they are parallel with one another.

19 Claims, 17 Drawing Sheets

CLAMP FOR HOLDING A WORKPIECE FOR MACHINING

CROSS REFERENCE TO RELATED APPLICATION(S)

This application is a 371 National Phase application of PCT Patent Application No. PCT/GB2016/053623 filed on 21 Nov. 2016, which claims priority to United Kingdom Patent Application No. 1520713.7 filed on 24 Nov. 2015, the entire content of all of which is incorporated by reference herein.

FIELD OF THE INVENTION

The present invention provides an improved clamp for holding workpieces for machining. The clamp is particularly suitable for holding workpieces for CNC machining or other similar machining processes. The clamp is suitable for use in picture frame machining techniques. The clamp is advantageous as it can allow access to both sides of a workpiece without the need to unclamp and reclamp the workpiece.

BACKGROUND

Machining is a well-known technology wherein a block of material is shaped into a desired form by removing portions of the material using an appropriate tool in a precisely controlled manner. Much modern machining is carried out by CNC machining wherein the removal of material is computer controlled.

A block of material that is being machined is generally known as a workpiece. A major issue in machining is the appropriate clamping of a workpiece. A workpiece has to be clamped in such a manner that it is held completely stationary whilst being machined and such that the workpiece can be adequately accessed by a cutting tool held in a machine spindle. Holding a workpiece stationary against the forces acting on it during machining requires that a workpiece is securely held by a large clamping force over as large an area as possible. Providing adequate access to a workpiece to allow machining requires that the area of the workpiece obscured by clamping means is minimised as far as possible. These competing requirements can make the proper clamping of workpieces problematic.

In some situations edge-clamping of a workpiece may be possible and sufficient. In edge-clamping either one edge of the workpiece will be held within a clamp or the workpiece will be held within a clamp between two of its opposing edges. The clamp will be mounted on a machine table of the relevant machine. In order for edge-clamping to be possible it is necessary that the workpiece is prismatic as generally it is not possible to edge-clamp non-prismatic pieces. Edge clamping of a single edge of a workpiece is not ideal as it can allow the workpiece to flex or bend when being machined. Edge clamping between two opposing edges of a workpiece is often preferable but is often not practical for large and heavy workpieces. Therefore, there is a need for an improved method or apparatus for clamping a non-prismatic workpiece for machining.

Clamping of workpieces is also particularly problematic when it is necessary to machine more than one side of a workpiece, for example when it is necessary to machine opposing faces of a workpiece. This is especially difficult where the part being machined is non-prismatic and it is not possible to edge-clamp the workpiece whilst machining a second side of the workpiece. In this situation custom solutions are required to adequately hold a workpiece when machining the second side of the workpiece.

One solution to this problem is to use a picture frame machining method, rather than conventional machining. In conventional machining any part of the workpiece that does not form part of the final piece is machined away. This requires that the final piece itself is clamped in position. In picture frame machining only the portion of the workpiece immediately surrounding the final piece is machined away and a frame is left around the final piece. The final piece is connected to the surrounding frame by a plurality of tabs or bridges, which as a final stage of production can be broken and manually removed from the final piece. Picture frame machining is advantageous as it allows a prismatic frame to be maintained around a non-prismatic piece to allow clamping of the workpiece throughout the machining process.

However, even in picture frame machining it is difficult to allow reliable and accurate machining of both sides of a workpiece. A currently preferred method of picture frame machining from plate metal is as follows. As a first step the plate is made flat, this is done by skimming a first face of the plate and then turning the plate over and skimming the second side. This produces a flat plate that is suitable for use as a workpiece. Subsequently, a plurality of fixing and location holes are drilled through the workpiece to allow it to be fixed to a machine table via a flat tooling plate that allows access to one side of the workpiece. The fixing holes are used to fix the workpiece in position on the tooling plate. The workpiece is then machined on a first side. After machining on the first side, the workpiece is unbolted from the tooling plate, turned over, and re-bolted to the tooling plate using the location holes to accurately position the workpiece on the tooling plate. The workpiece is then machined on a second side. Turning over a workpiece during machining is disadvantageous as, even with the use of location holes, it can introduce inaccuracies in the machining between the two sides of the workpiece. Further, if the workpiece is heavy, lifting and turning over the workpiece can be difficult.

As an alternative to using a flat tooling plate, a window-frame tombstone tooling plate can be used. Such a tooling plate allows free access to a first side of a workpiece bolted thereto and limited access to a second side of a workpiece through a window-frame formed centrally in the tooling plate. This can mean that it is not necessary to turn a workpiece over during machining. However, due to the need for the tooling plate to provide a strong support for the workpiece it is often necessary for window-frame tombstone tooling plates to have a substantial thickness and this can make access to the second side of the workpiece through the window-frame difficult. Further, it the workpiece is heavy fitting the workpiece to a tombstone tooling plate can be problematic.

As set out above, in picture frame machining it is necessary to use either a flat tooling plate or a window-frame tombstone tooling plate. Such plates are often custom made for the manufacture of a specific workpiece. This can add significant cost to the machining process and, as discussed above, neither tooling plate provides an ideal solution to the problem of holding a workpiece securely for picture frame machining. Therefore, there is a need for an improved method or apparatus for securely holding a workpiece for picture frame machining.

SUMMARY OF INVENTION

The present invention provides a clamp for holding a workpiece for machining, the clamp comprising:

a frame comprising a base, a first arm, and a second arm, the first arm and the second arm each mounted to the base at an inner end such that they are parallel with one another;

a set of opposed vices mounted at facing sides of the frame to hold a workpiece therebetween, the set of vices having exactly three self-centering vices, two mounted at the first side of the frame and one mounted at a second opposing side of the frame.

The set of opposed vices may consist of only the three self-centering vices. Alternatively, the set of opposed vices may consist of the three self-centering vices and one or more floating vices.

In use the clamp of the present invention can be mounted on a machine table of a machine. In particular, it may be preferable that the base of the clamp is formed such that it can be securely mounted on a machine table of a machine with which it is intended to be used. Most machine tables are standard components with standard fittings for affixing clamps and workpieces. As such it is considered that the skilled person will readily understand how a base of a clamp according to the present invention can be formed to be mounted on a machine table of a machine.

The present invention is advantageous in that it provides an improved clamping means for holding a workpiece for machining. The clamping means is particularly advantageous for use in picture frame machining techniques. The improved clamping means allows a workpiece to be held in a frame by means of a set of opposing vices mounted at opposing sides of the frame. The clamp of the present invention is much easier to use than similar devices in which opposing arms are used to directly clamp a workpiece therebetween and allows for much more adjustability.

The provision of exactly three self-centering vices allows a workpiece that is not completely flat to be held in a stable orientation with respect to a machine without the need to first machine the workpiece flat. The optional provision of floating vices allows a workpiece that is held in the stable orientation to be securely held by additional vices without those additional vices affecting the orientation of the workpiece or inducing distortion into the workpiece. This can provide exceptionally strong clamping of a workpiece.

A workpiece held in a clamp according to the present invention will be held by the set of opposing vices mounted at the facing sides of the frame. Importantly, the clamp will only support the workpiece at its edges thereby allowing free and unencumbered access to both sides of a workpiece mounted in the clamp without the need to remove the workpiece from the clamp. After machining a first side of a workpiece mounted in a clamp according to the present invention all that is required to access a second side of the clamp is either to move the machine to the second side or to rotate the clamp by means of the machine table on which it is mounted. This can make the clamp particularly suitable for use in picture frame machining techniques.

The clamp of the present invention can be used in the following manner. The clamp will be mounted on a machine table of a machine with which it is to be used. Preferably the clamp will be mounted such that the first arm and the second arm of the frame are substantially vertical. The arms will be fixed at, or moved to (if they are movable), an appropriate width apart for the workpiece that is to be clamped. The set of opposing vices will be opened to a width that is greater than the thickness of the workpiece between a first side and a second side. The workpiece will then be positioned in the clamp in the frame such that it is positioned within each vice of the set of opposing vices. This may involve vertically lowering the workpiece into the clamp. This can be done in any manner apparent to the person skilled in the art. For example, heavy workpieces can be lowered in using noosed straps or other carrying means. After positioning the workpiece appropriately within each vice of the set of opposing vices, the self-centering vices will be tightened to hold the workpiece in a stable orientation within the clamp. After the self-centering vices have been tightened any floating vices of the clamp will be tightened to further hold the workpiece within the clamp. After all of the vices of the set of opposing vices have been tightened to hold the workpiece in position the workpiece is then able to be machined. In order to remove the workpiece from the clamp the process is reversed.

If the arms are movable in the base relative to one another, as discussed below, in some situations it may be possible to position a workpiece within the clamp between the first and second arms and between the set of opposing vices and then to move the first and second arms together in order to position the set of opposing vices appropriately over edges of the workpiece.

In order to access a different side of the workpiece all that is required is that the clamp is rotated relative to the machine, for example by rotation of the machine table on which it is mounted. Generally, it is not necessary to remove the workpiece from the clamp in order to access a different side of the workpiece. Whilst the workpiece is held in the clamp it will be held in a stable and constant orientation relative to the clamp.

In some embodiments of the invention the frame of the clamp is a closed frame and comprises a top bar mounted to an outer end of the first arm and an outer end of the second arm and extending therebetween. If the frame comprises a top bar it may be permanently fixed to the outer ends of the first arm and the second end or may be removable. It may be preferable that the top bar is removable in order to allow a workpiece to be positioned within the frame without difficulty.

In embodiments of the invention wherein the frame comprises a top bar the first side of the frame may be one of the base or the top bar and the second side of the frame may be the other of the base and the top bar. That is, the set of opposed vices may be mounted at the top bar and the base. In alternative embodiments where the frame comprises a top bar the first side of the frame may be one of the first arm and the second arm and the second side of the frame may be the other of the first arm and the second arm. In such embodiments the vices will be mounted at the first arm and the second arm.

In alternative embodiments the frame of the invention is an open frame consisting of the base, the first arm, and the second arm and the first side of the frame is one of the first arm and the second arm and the second side of the frame is the other of the first arm and the second arm. That is, in such embodiments the frame is open at an outer end of the first arm and an outer end of the second arm and the vices are mounted at the first arm and the second arm. In such embodiments the first arm and the second arm may be mounted to the base in fixed positions relative to one another or they may be mounted to the base such that they are movable towards and apart from one another.

Having the first arm and the second arm mounted to the base such that they are movable towards and apart from one another is advantageous in that it allows the clamp to be adjusted to hold workpieces of different sizes. The first and second arms can be positioned closer together to hold a narrower workpiece and can be positioned further apart to hold a wider workpiece.

If the first arm and the second arm are movable toward and apart from one another they may be mounted to the base at an inner end by any suitable mechanism such that they are parallel with one another. This may be achieved in any manner apparent to the person skilled in the art. Either the first arm or the second arm may be fixedly mounted to the base such that only the other of the first or second arm is movable relative to the base. However, it may be preferable that both the first arm and the second arm are movable relative to the base and the base for example such that the first and second arms effectively form a symmetrically adjustable open frame.

The first arm and the second arm may be mounted in the base by means of a dovetail mount such that they can be moved along the length of the base but cannot be pulled out of the base. If the first arm and the second arm are mounted in this manner then the clamp may further comprise a screwed wedge for clamping the first arm and the second arm in position in the dovetail mount.

If the first arm and the second arm are movable towards and apart from another the mechanism by which the first arm and the second arm are mounted to the base may be formed in any suitable manner. It may be preferable that the clamp comprises a positioning screw extending through the base, the first arm and the second arm for moving the first arm and the second arm towards and apart from one another. If the mechanism is formed in this manner it may be preferable that the positioning screw comprises a left-hand thread portion for moving a first of the first or second arms and a right-hand thread portion for moving the other of the first or second arms and the left-hand thread portion and the right-hand thread portion are joined centrally between the first arm and the second arm such that rotating the positioning screw moves the first arm and the second arm in opposing directions. A vice mechanism formed in this manner will act as a self-centering vice wherein the first arm and the second arm are always moved together and apart from one another about a fixed centre.

As explained above, the clamp of the present invention has exactly three self-centering vices. The clamp may or may not have additional floating vices. However, in all but the smallest clamps according to the present invention, it is considered that it will be generally advantageous that the clamp comprises one or more floating vices. Any floating vices may be positioned in any manner that is apparent to the person skilled in the art. It may be preferable that any floating vices are positioned such that the first side of the frame and the second side of the frame have the same number of vices mounted thereat and/or such that the vices are substantially equally spaced along each of the first side of the frame and the second side of the frame.

Embodiments of the invention may comprise three or more floating vices including one mounted at the first side of the frame and two mounted at the second side of the frame. Embodiments of the invention may comprise five vices, including the two self-centering vices, mounted at the first side of the frame and five vices mounted at the second side of the frame, including the first self-centering vice. Such embodiments may be formed such that the self-centering vice mounted at the second side of the frame is the central vice mounted at that side of the frame and the self-centering vices mounted at the first side of the frame are the second and fourth vices mounted at that side of the frame.

It is considered that the skilled person will readily understand the various different ways in which self-centering vices and a floating vices may be constructed. A self-centering vice is a vice in which the centre of the vice cannot be moved such that a body held in the vice is always centred at the same position. A floating vice is a vice in which the centre of the vice may move (or float) between set limits such that a body held in the vice may be centred in any position between those set limits. Examples of self-centering and floating vices are shown in detail in the specific embodiment of the invention shown in the Figures and described below. However, it is to be understood that the construction of the vices shown in the Figures and described below is purely exemplary and for any embodiment of the present invention the self-centering vices and any floating vices may be formed in any manner apparent to the person skilled in the art.

The clamp of the present invention may further comprise one or more supports mounted on the base between the first arm and the second arm for supporting an inner side of a workpiece supported between the arms if the clamp is used in an orientation where the workpiece is substantially vertical. Such supports may be formed in any manner apparent to the person skilled in the art. A support may be an additional floating vice for supporting the workpiece. Alternatively or additionally, a support may be a simple block, or other similar element, on which an inner side of a workpiece mounted within the clamp may rest in order to transfer some of the weight of the workpiece direct to the base, rather than the entire weight of the workpiece acting through the first arm and the second arm. Preferably in embodiments of the invention wherein the first arm and the second arm are movable towards and apart from one another any support mounted on the base between the first arm and the second arm will be mounted centrally therebetween such that the movement of the first arm and the second arm together and apart from one another is not limited. Any such support may additionally or alternatively act as a lifting eye by which the clamp may be lifted, as discussed below. A support formed in this manner may also be used as a positioning guide in situations where the workpiece is not substantially vertical and no weight will be carried by the support.

A clamp according to the present invention may comprise a lifting eye mounted on the base between the first arm and the second arm, preferably substantially centrally between the arms. A lifting eye may comprise an attachment having an aperture by which suitable lifting apparatus can lift the clamp. For example, if the support comprises an aperture the clamp may be lifted by using lifting straps passed through the apertures. It may be preferable that it a lifting eye positioned above a centre of gravity of the clamp such that the clamp can be lifted by the lifting eye without difficulty. It may also be preferable that the clamp is formed to be balanced about a lifting eye. As set out above, a lifting eye may also act as a support if a workpiece is positioned substantially vertically within the clamp.

A clamp according to the present invention may further comprise support means formed at an inner end of the first arm and/or at an inner end of the second arm for supporting an inner side of a substantially vertical workpiece supported between the arms. Any such support means may be fixed or may be adjustable. Such support means will allow a proportion of the weight of a substantially vertical workpiece positioned between the arms to rest upon the support at an inner side so that the entirety of the weight of the workpiece is not supported through the vices. If the support means is adjustable it may comprise a support plate that can be bolted to the inner end of the first arm or the inner end of the second arm. Advantageously, such a support plate may be provided at the inner end of the first arm and the inner end of the second arm at substantially equivalent positions. If the support means comprises one or more support plates it may be preferable that the or each support is adjustable in that it can be bolted in a plurality of different positions for supporting workpieces of different sizes. This can be achieved by providing a plurality of fixing apertures in the support plate and/or at appropriate positions in the first arm and/or second arm. An example, of support plates formed in this manner is shown in the specific embodiment of the invention shown in the Figures and described below. A support means of the present invention may be used as a positioning guide in situations where the workpiece is not substantially vertical and no weight will be carried by the support.

A clamp according to the present invention may be made of any suitable material or materials that are apparent to the person skilled in the art. For example, the clamp may be made of any material that is currently used to make clamps or vices for machining.

The present invention also provides methods of machining a workpiece using a clamp according to the present invention.

A first method comprises the sequential steps of:
fixing the clamp to a machine platform of a machine;
positioning the workpiece in the clamp such a first edge is positioned within arms of the self-centering vices and any floating vices of the first side of the frame and a second opposing edge is positioned within arms of the self-centering vice and any floating vices of the second side of the frame;
tightening the self-centering vices of the clamp onto the workpiece;
tightening any floating vices of the clamp onto the workpiece; and
machining the workpiece.

A second method is suitable for embodiments of the invention wherein the first side of the frame is one of the first arm and the second arm, the second side of the frame is the other of the first arm and the second arm, and the first arm and the second arm are movable towards and apart from one another. The second method comprises the sequential steps of:
fixing the clamp to a machine platform of a machine and positioning the first arm and the second arm of the clamp an appropriate distance apart;
positioning the workpiece in the clamp such a first edge is positioned within arms of the self-centering vices and any floating vices of the first side of the frame and a second opposing edge is positioned within arms of the self-centering vice and any floating vices of the second side of the frame;
tightening the self-centering vices of the clamp onto the workpiece;
tightening any floating vices of the clamp onto the workpiece; and
machining the workpiece.

Further details and features of the invention will be apparent from the preferred embodiments that are shown in the Figures and are discussed below.

DRAWINGS

Figure 1:
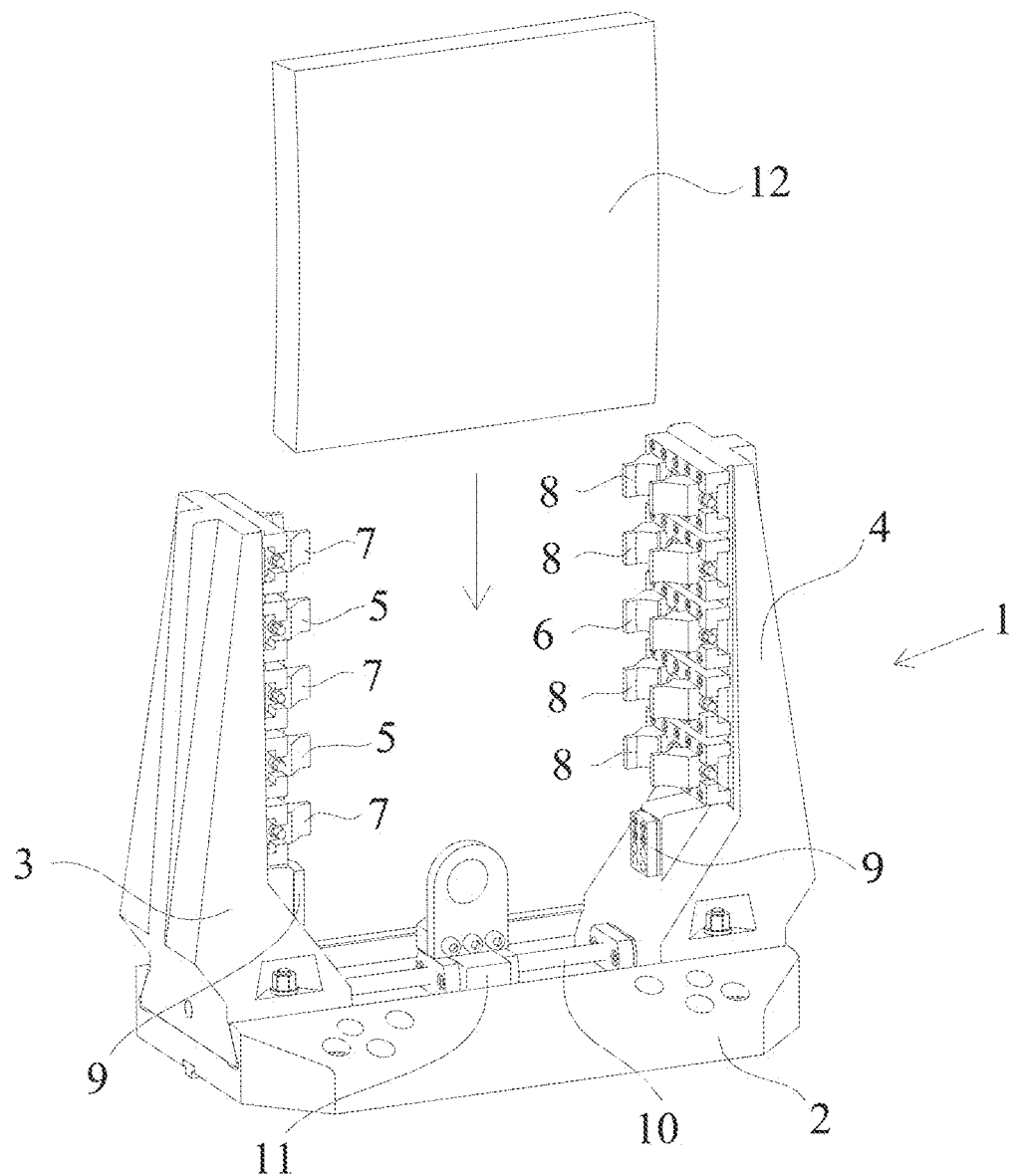
FIG. 1 shows a clamp according to a first embodiment of the present invention having a workpiece lowered therein.

A clamp 1 according to a first embodiment of the present invention is shown in the Figures. The clamp 1 comprises a base 2, a first arm 3, a second arm 4, and a set of opposed vices 5, 6, 7, 8 mounted at inner faces of the first arm and the second arm, five at the inner face of each arm. The set of opposed vices consist of two self-centering vices 5 mounted at the inner face of the first arm 3, one self-centering vice 6 mounted at the inner face of the second arm 4, three floating vices 7 mounted at the inner face of the first arm 3, and four floating vices 8 mounted at the inner face of the second arm 4. The vices 5, 6, 7, 8 are evenly vertically spaced along each of the first arm 3 and the second arm 4. As can be seen in the Figures, the self-centering vice 6 of the second arm 4 is the central vice of the five vices 6, 8 mounted thereat. The self-centering vices 5 of the first arm are the second and fourth of the five vices 5, 7 mounted thereat. Together the base 2, first arm 3, and second arm 4 form an open frame within which a workpiece 12 can be held.

A supporting plate 9 is affixed to each of the first arm 3 and the second arm 4. The supporting plates 9 are fixed to an inner face of the first arm 3 and the second arm 4 adjacent an inner end of the arms and below the innermost of the opposed vices 5, 6, 7, 8 mounted thereat.

The first arm 3 and the second arm 4 are mounted together by means of a positioning screw 10. A support 11 is mounted centrally on the base 2 between the first arm 3 and the second arm 4. The positioning screw 10 extends through the support 11. The support 11 is stationary and does not move when the position of the first arm 3 and the second arm 4 is varied, as discussed below.

Figure 2:
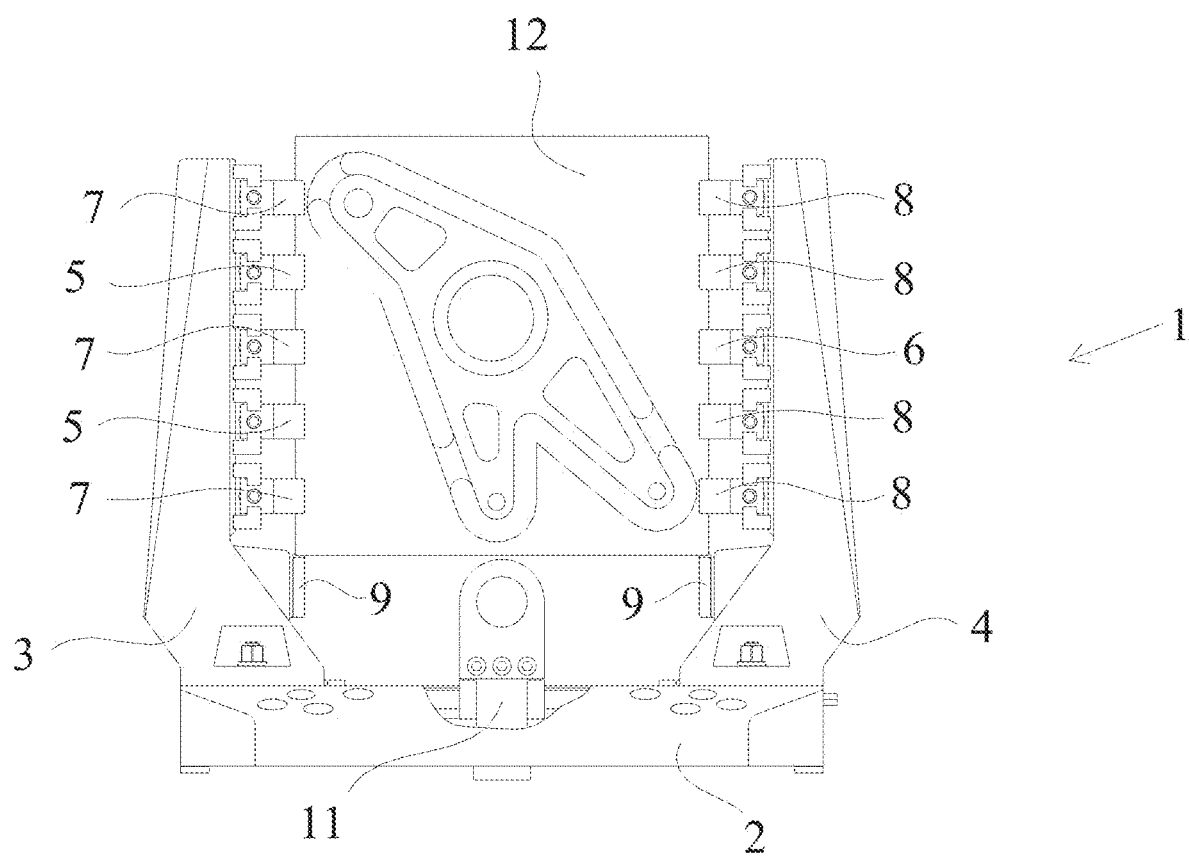
FIG. 2 is a front view of the first embodiment having a workpiece held therein.

When in use, a workpiece 12 is supported at two edges between the first arm 3 and the second arm by means of the opposed vices 5, 6, 7, 8 and rests upon the supporting plates 9 at a third edge. This is shown clearly in FIG. 2. When supported in the clamp 1 in this manner the workpiece 12 can be machined from both sides. In particular, a non-prismatic workpiece 12 supported in this manner can be machined using a picture-frame machine method to form a non-prismatic final object.

Figure 3:
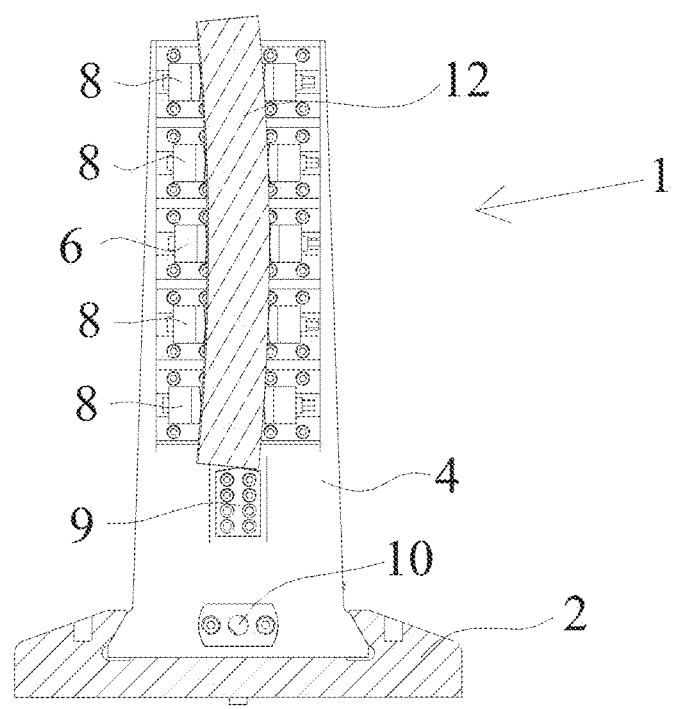
FIG. 3 is a cross-sectional view through the first embodiment and the workpiece held therein.

The workpiece 12 shown in the Figures is not flat, it is a section of machinable plate having a slight curve resulting from its method of manufacture. The use of self-centering vices 5, 6 and floating vices 7, 8 allows the non-flat workpiece 12 to be held securely within the clamp 1 and in a stable orientation relative to the clamp 1 and any machine that may be used to machine the workpiece 12. In particular, the self-centering vices 5, 6 hold the workpiece 12 in a triangulated plane formed between the self-centering vices. As only the three self-centering vices 5, 6 act to hold or move the workpiece 12 into this triangulated plane there are no bending forces acting on the workpiece 12 when it is held in this plane. The floating vices 7, 8 act to secure the workpiece 12 within the clamp 1 but as they are floating across a width of the first arm 3 and the second arm 4 they do not act to bend the workpiece out of the triangulated plane defined by the self-centering vices 5, 6. Rather, the floating vices 7, 8 adjust to the shape of the workpiece 12 being held within the clamp 1. This is clearly shown in FIG. 3, which shows a curved workpiece 12 held in the second arm 4 by means of the self-centering vice 6 and the floating vices 8.

Figure 4:
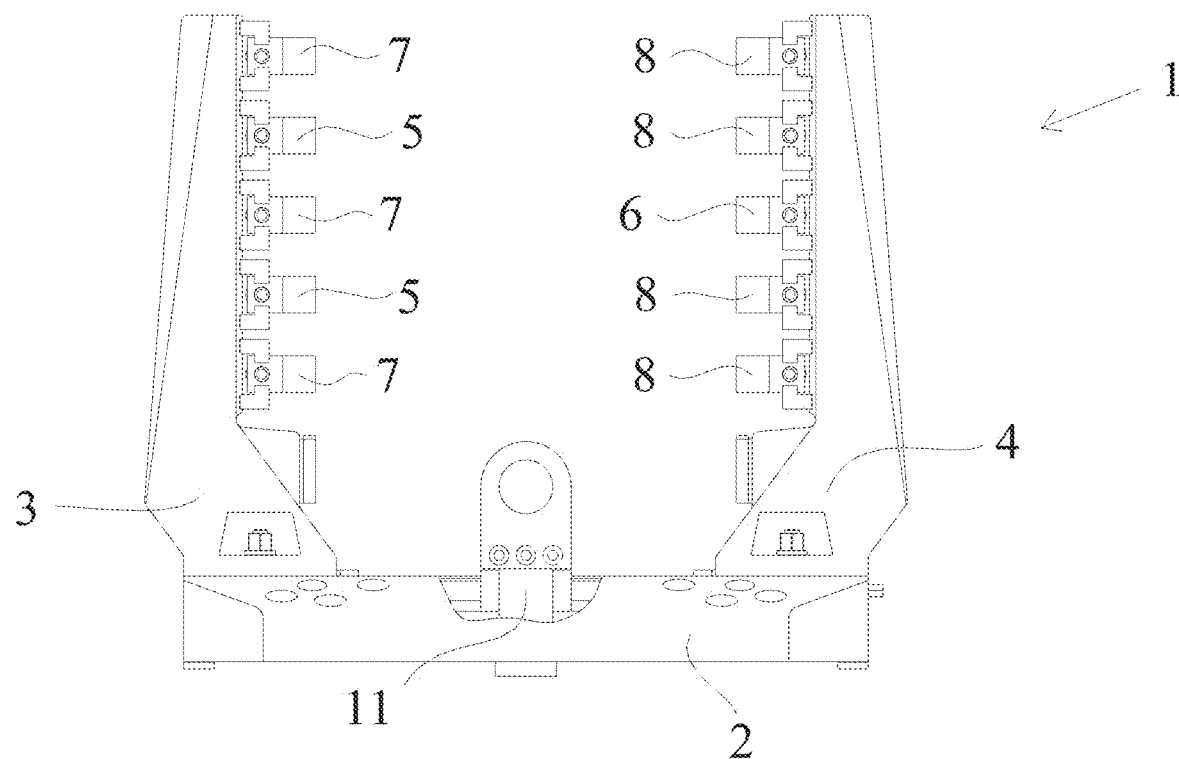
FIGS. 4 and 5 show the first embodiment without a workpiece illustrating the movement of the arms of the clamp relative to one another.
Figure 5:
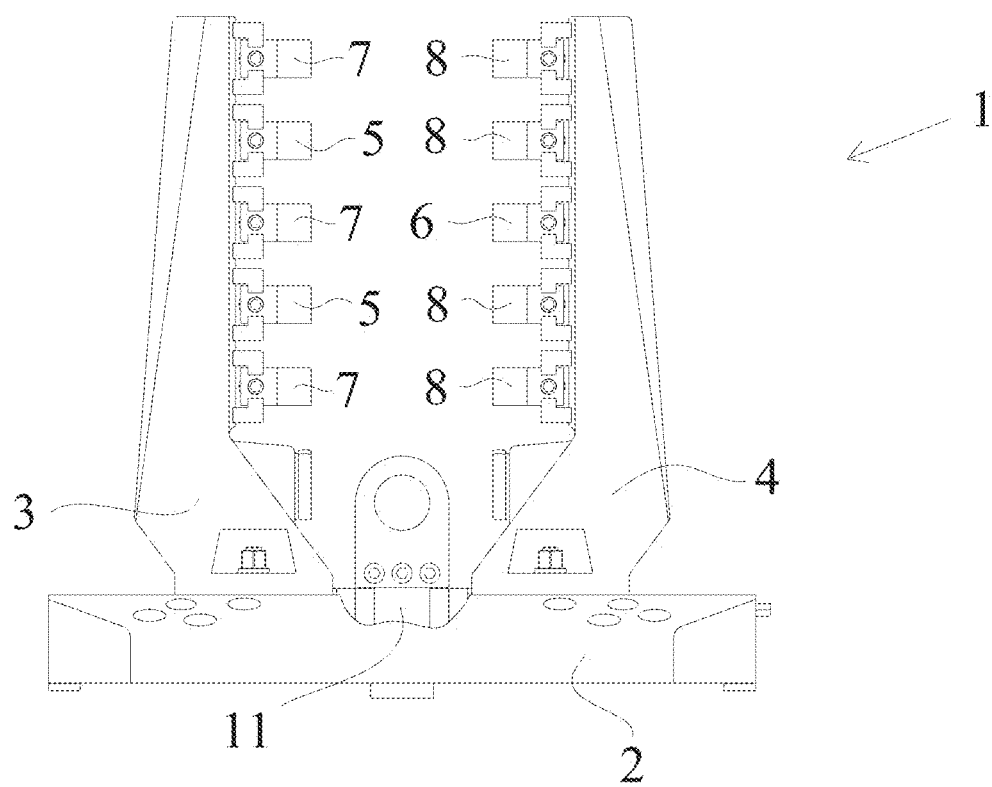

The first arm 3 and the second arm 4 are movably mounted within the base 2 at an inner end and are mounted together by means of a positioning screw 10. The position of the first arm 3 and the second arm 4 can be varied using the positioning screw 10. As shown in FIGS. 4 and 5, the movement of the first arm 3 and the second arm 4 is controlled such that they remain equidistant from a centre of the base 2 where the support 11 is mounted. That is, when the positioning screw 10 is rotated the first arm 3 will move towards or away from the centre of the base 2 at the same rate as the second arm 4 moves in the opposing direction. Turning the positioning screw 10 in a first direction will move the first arm 3 towards the second arm 4. Turning the positioning screw 10 in a second direction will move the first arm 3 apart from the second arm 4. In both situations the first arm 3 and the second arm 4 will move at the same speed. Details of the positioning screw are also apparent from FIG. 8, which is discussed below.

Figure 6:
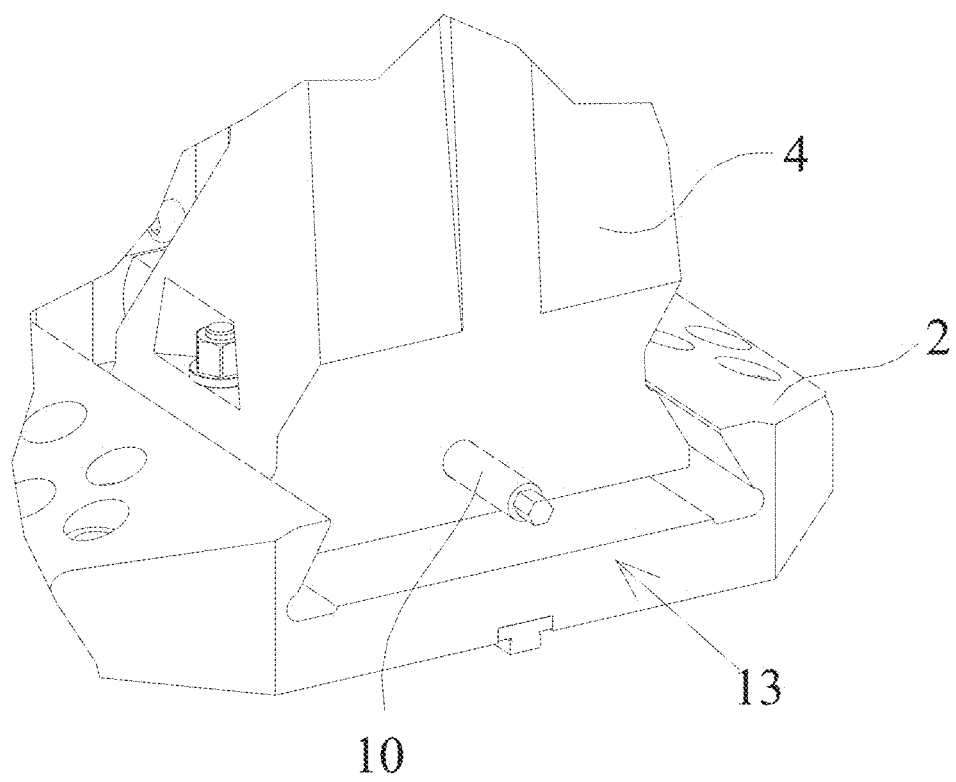
FIGS. 6 and 7 show detail of how the arms of the first embodiment are mounted and secured in the base.

The inner ends of the first arm 3 and the second arm 4 are mounted in the base 2 by means of a dove-tail joint 13, shown clearly in FIG. 6. This allows the first arm 3 and second arm 4 to move along the base 2 without difficulty but otherwise holds the first and second arms 3, 4 securely in the base 2 and prevents their movement in any other direction.

Figure 7:
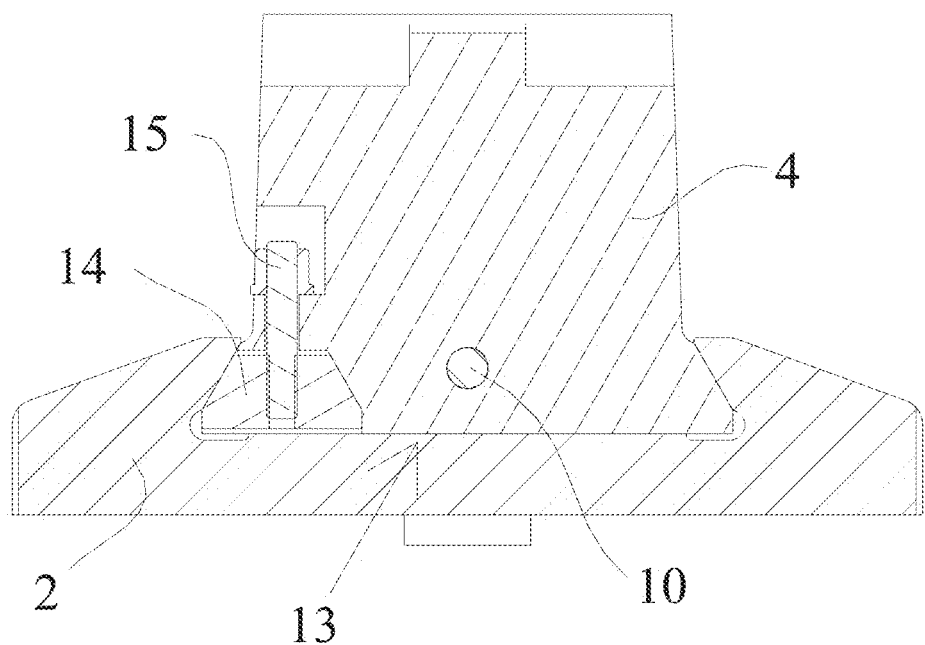

In order that the first arm 3 and second arm 4 can be held securely in position in the base 2 a screwed wedge 14 is provided for the second arm 4. This is shown clearly in FIG. 7. The wedge 14 can be adjusted by means of a screw 15 extending through the wedge and the second arm 4 such that it acts to pull the second arm 4 against the base 2 preventing the second arm 4 moving along the base 2.

Figure 8:
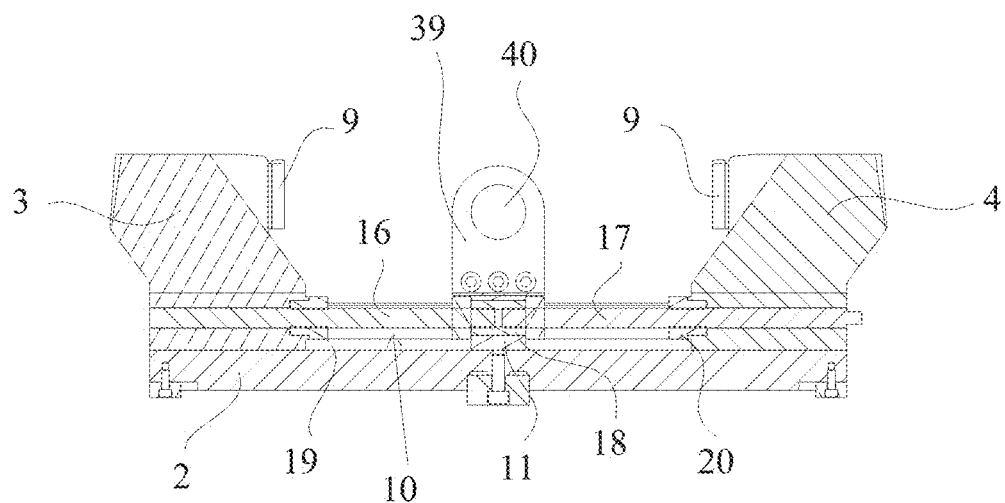
FIG. 8 illustrates the positioning mechanism of the arms of the first embodiment.

A cross section through the base 2, the first arm 3, and the second arm 4 is shown in FIG. 8. This Figure also shows the positioning screw 10 extending through the base 2, the first arm 3, and the second arm 4. The positioning screw 10 comprises a first part 16 that has left-hand thread and extends through the first arm 3, a second part 17 that has a right-hand thread and extends through the second arm 4, and a central connector 18 into which both the first part 16 and the second part 17 are fitted and pinned into position. A first nut 19 is fitted to the first part 16 and is fixed to the first arm 3. A second nut 20 is fitted to the second part 17 and is fixed to the second arm 4. A support 11 is formed in the centre of the base 2 and the central connector 18 passes through the support 11. Attached to the support is a lifting eye 39 with a central aperture 40 that can be used to lift the clamp 1 with the centre of gravity of the clamp 1 located below the central aperture.

Figure 9:
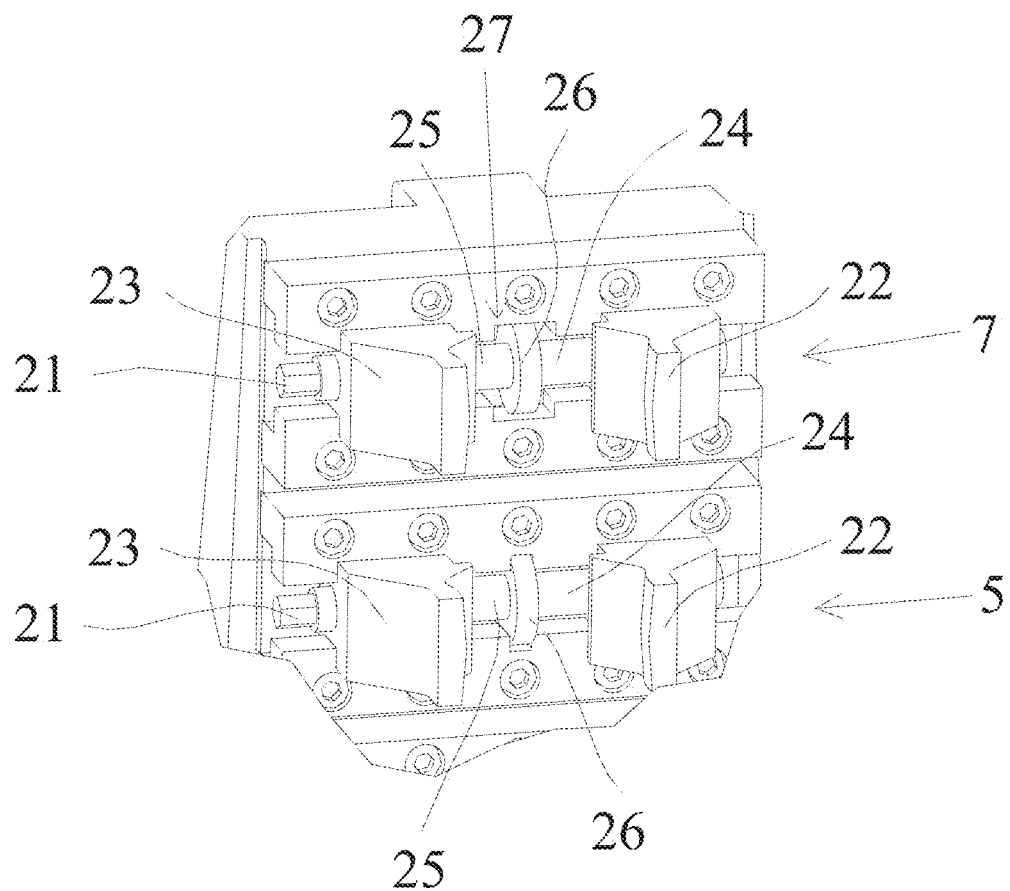
FIG. 9 shows detail of a self centering vice and a floating vice of the first embodiment.

Details of a self-centering vice 5 and a floating vice 7 of the present invention are shown in FIG. 9. The floating vice 7 is shown in the uppermost part of the Figure and the self-centering 5 vice is shown in the lowermost part of the Figure. The self-centering vice 5 and the floating vice 7 are formed in substantially the same manner. They each comprise a arm screw 21 having a right-hand threaded portion 24 extending through a first arm 22 of the vice 5, 6 and a left-hand threaded portion 25 extending through a second arm 23 of the vice 5, 6. The right-hand threaded portion 24 is joined to the left-hand threaded portion 25 by means of a joining flange 26 that has a significantly wider diameter than either the right-hand threaded portion 24 or the left-hand threaded portion 25. In the self-centering vice 5 the flange 26 is held in a central position within the arm 3. In the floating-vice 7 the flange 26 is free to move within a defined space 27 within the arm 3. As a result of this difference, the self-centering vice 5 will always act to clamp a workpiece 12 centrally within the arm 3 whilst the floating vice 7 can clamp a workpiece 12 away from the centre of the arm 3. A floating vice 7 can clamp a workpiece at any position that is centred on a position within the defined space 27 of the arm.

Figure 10:
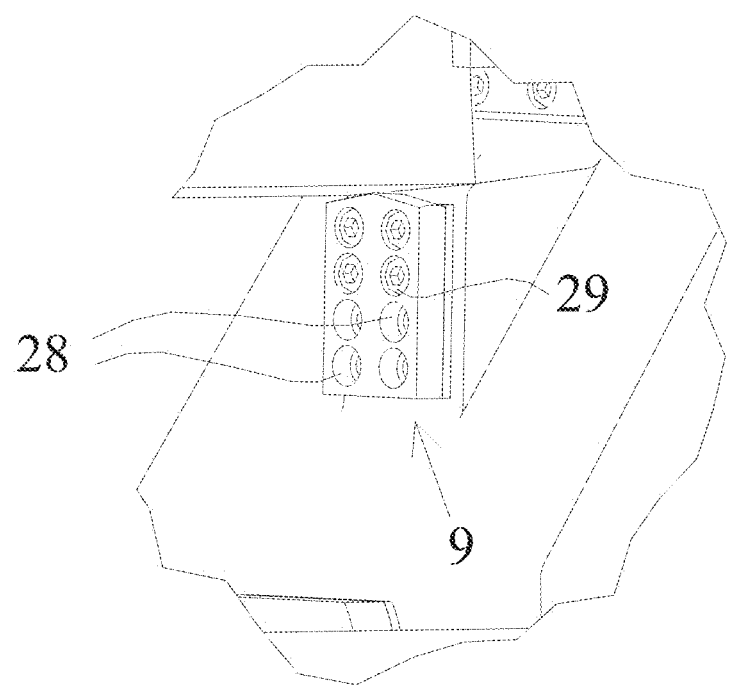
FIG. 10 shows detail of a support plate of the first embodiment.

The details of a supporting plate 9 of the clamp 1 is shown in FIG. 10. The supporting plate 9 is a metal plate with a plurality of bolt holes 28 formed therethrough. The support plate 9 can be fixed using bolts 29 positioned through the bolt holes 28 into cooperatively positioned apertures (not shown) formed in a arm 3, 4 in order to support a workpiece 12 positioned in the clamp 1. The support plate 9 can be fixed at different heights by fixing the plate 9 to the arm 3, 4 using different bolt holes 28. In order to support smaller workpieces 12 a differently shaped support plate 9 could be used. In particular, a support pate with an elongated upper portion may be provided.

The use of the clamp 1 to support a workpiece 12 during machining is shown in FIGS. 11 to 16.

Figure 11:
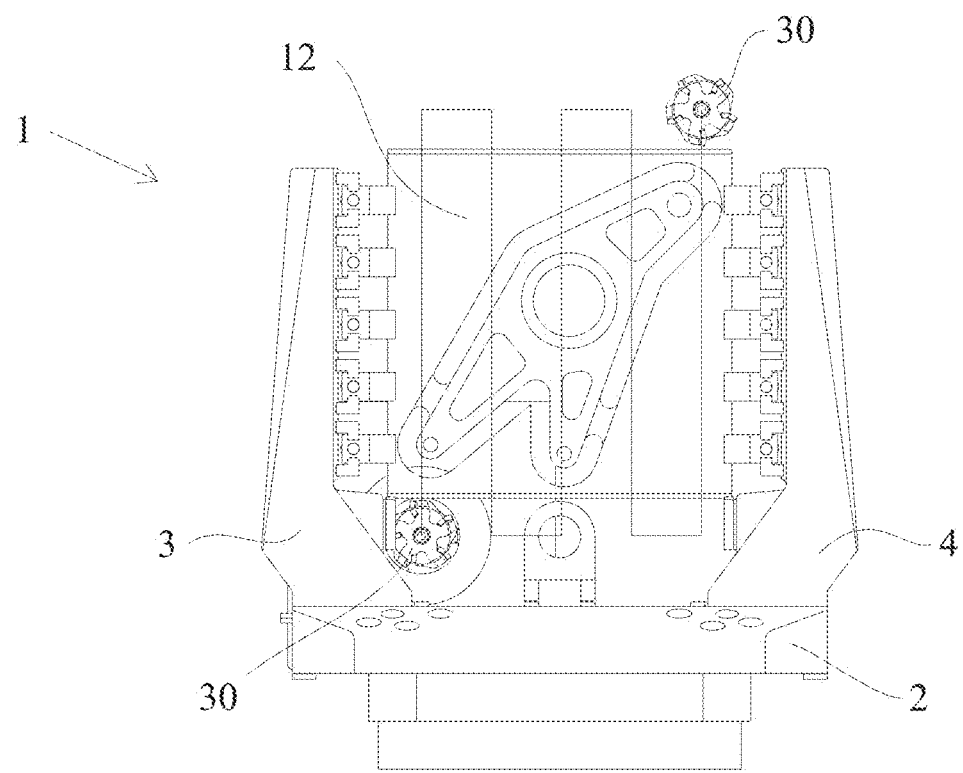
FIGS. 11 to 13 show how a workpiece held in the first embodiment can be machined using various cutting tools.
Figure 12:
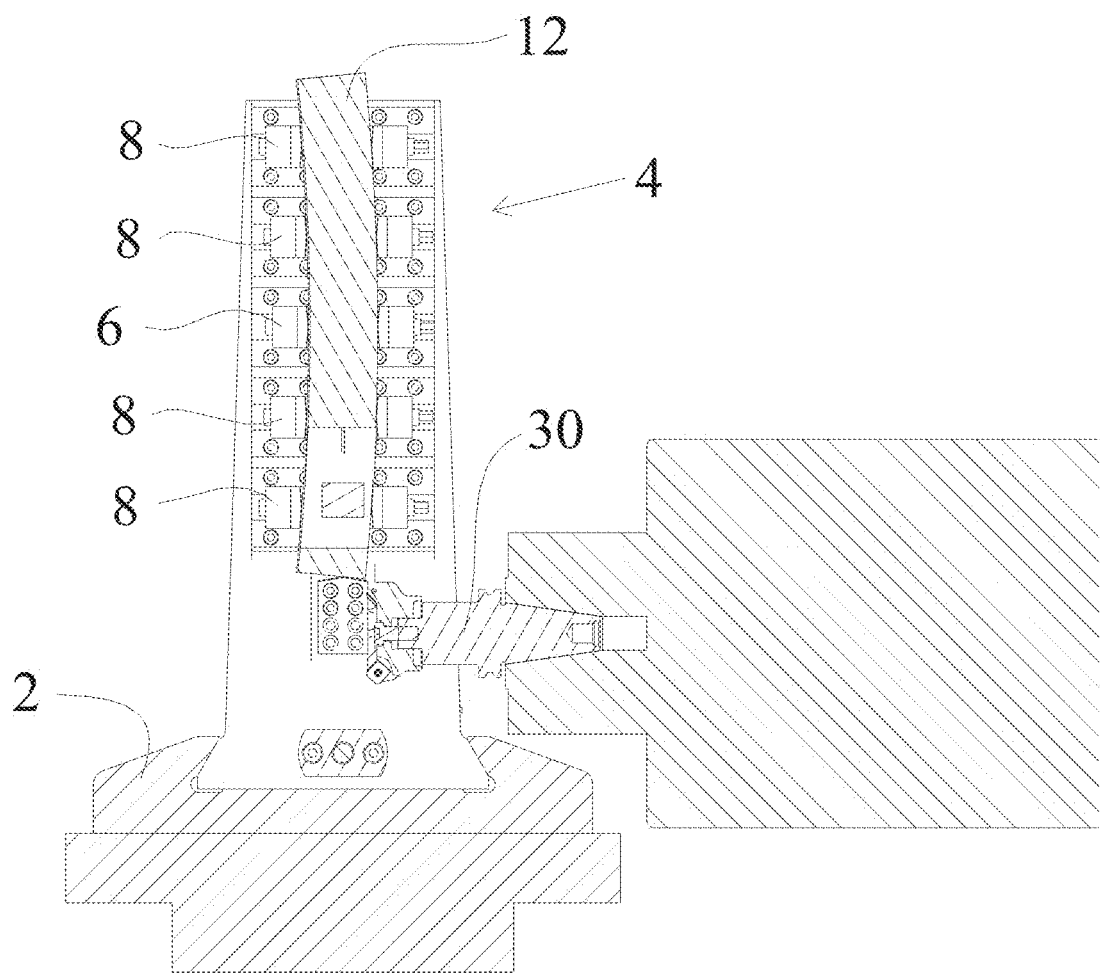
Figure 13:
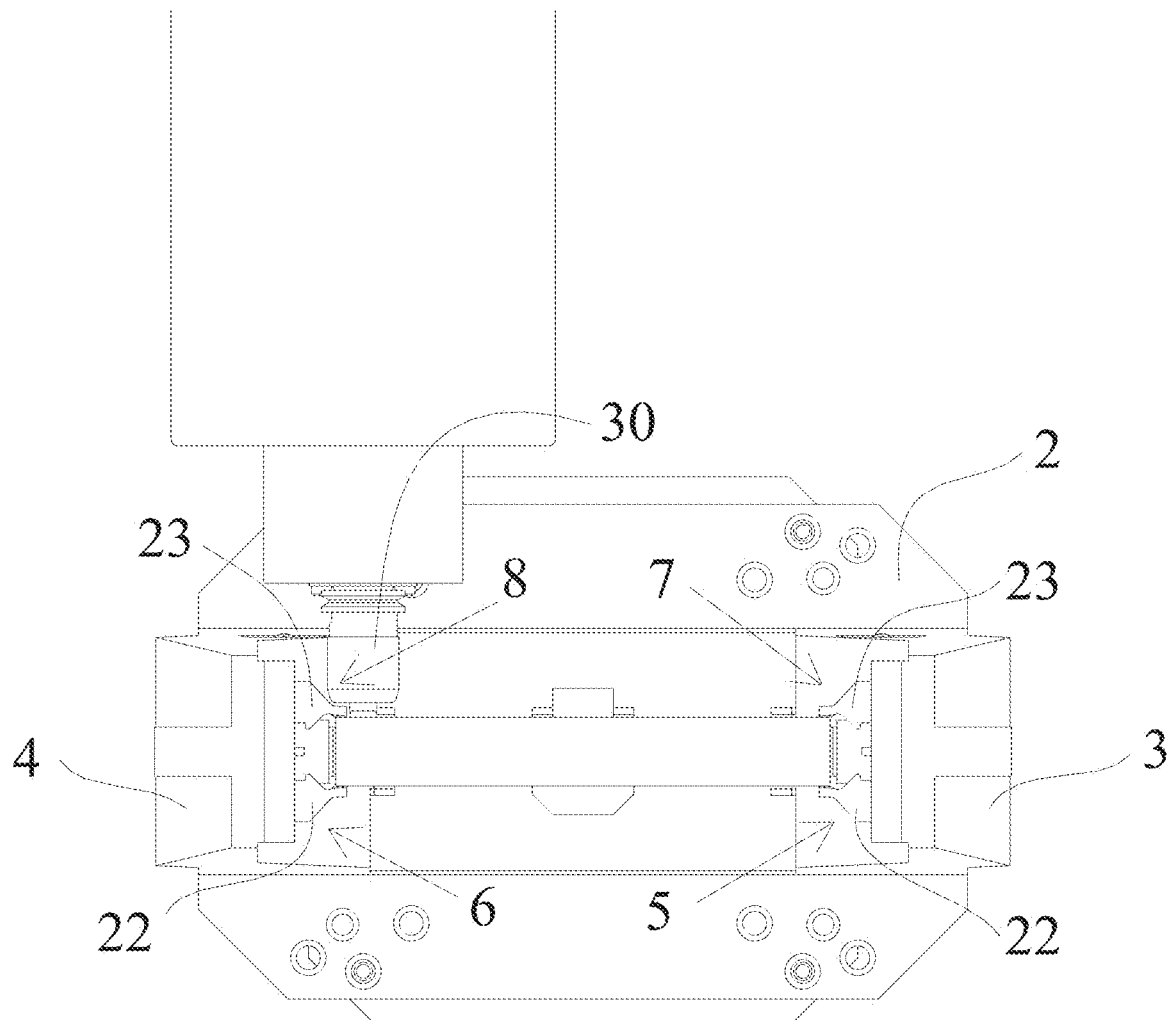

FIG. 11 shows the possible path of a machine tool 30 across the face of a workpiece 12 positioned in the clamp 1. FIG. 12 shows the machine tool 30 in the starting position of the path, clearly showing how the clamp 1 allows the tool 30 good access to the workpiece 12 positioned within the clamp 1. FIG. 13 shows the contour of the arms 22, 23 of the vices 7, 8. In particular, the arms 22, 23 are formed to allow clear access around the arms for the machine tool 30.

Figure 14:
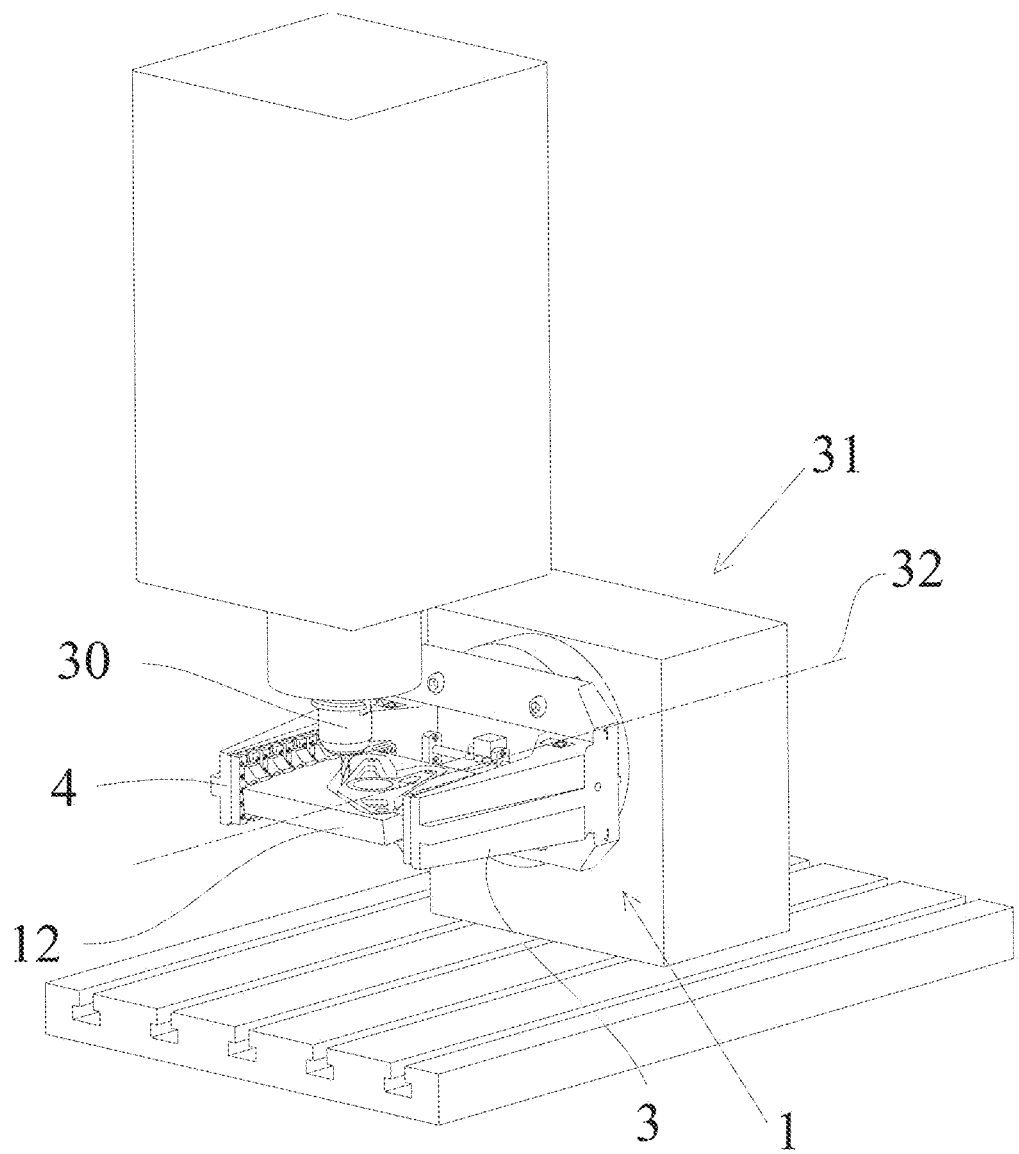
FIGS. 14 to 16 show how the clamp of the first embodiment can be mounted on various machine tools.
Figure 15:
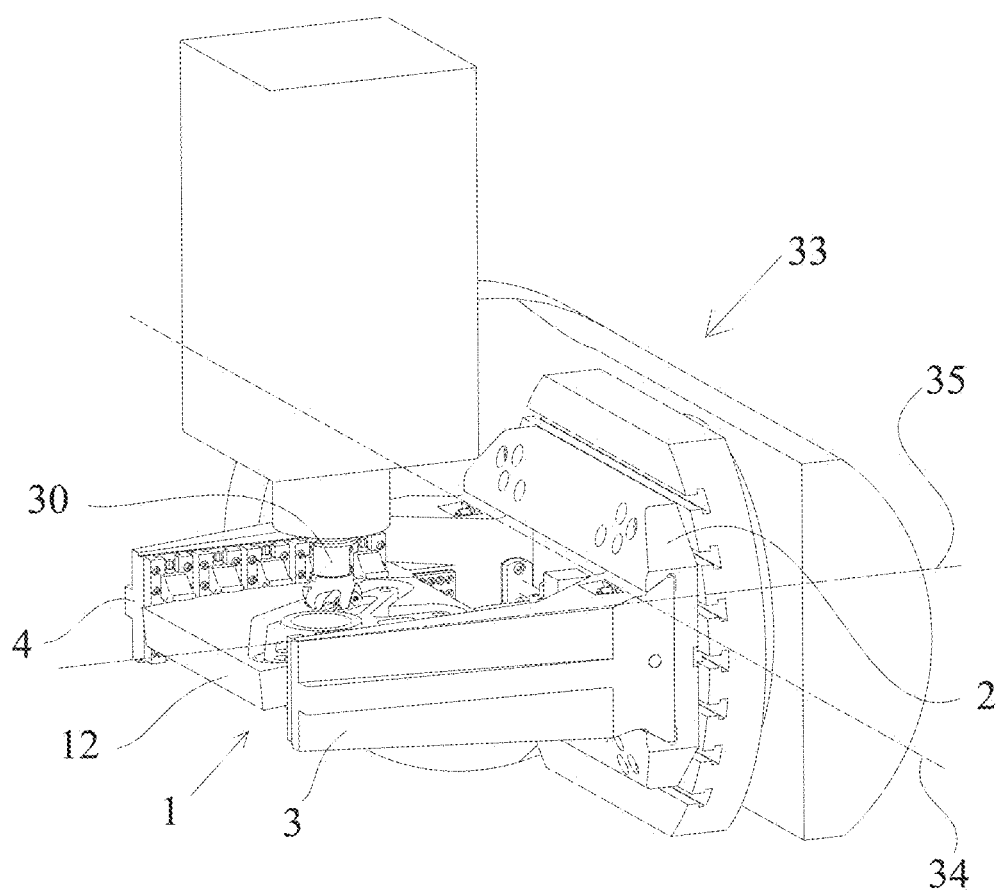
Figure 16:
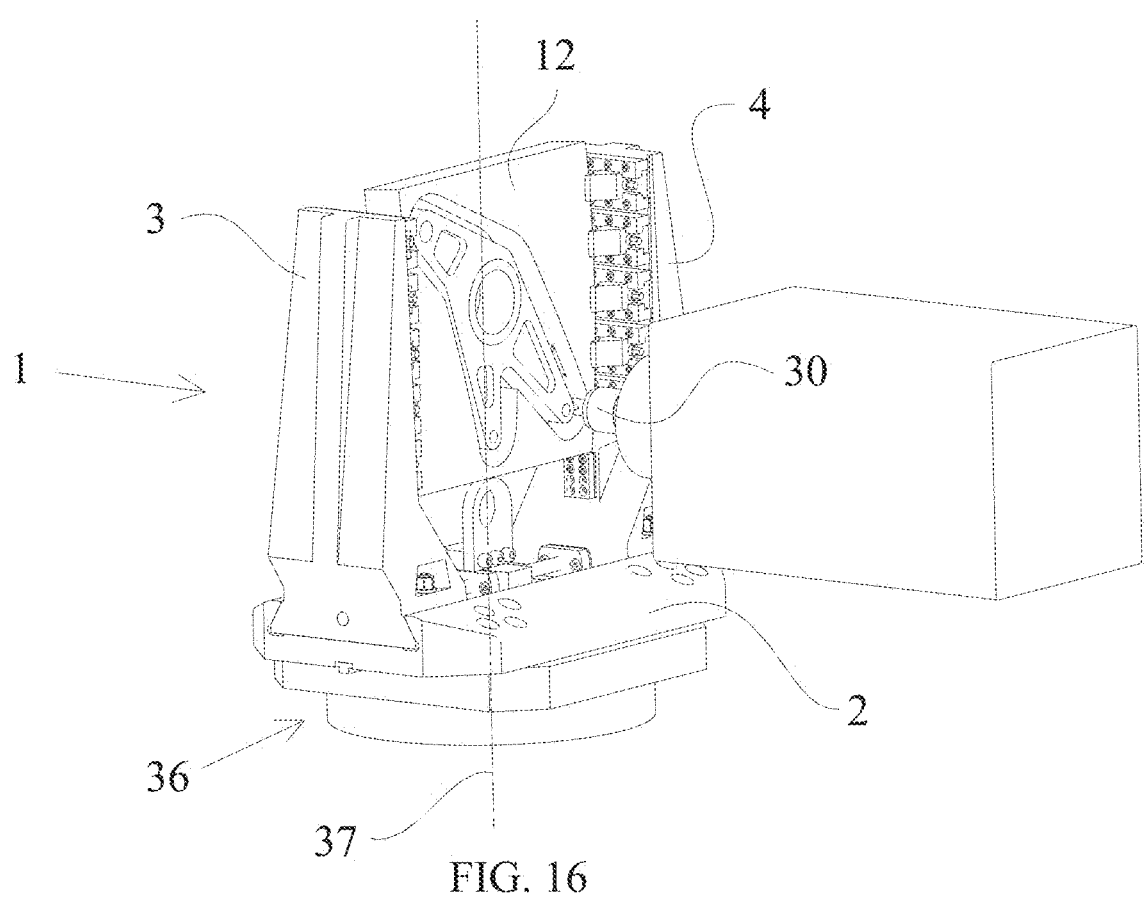

FIGS. 14 to 16 show the clamp 1 mounted to various different machine tool configurations which provide for rotation of the clamp to permit a cutting tool to access the workpiece 12 from both sides. FIG. 14 shows a 3-axis certical machine tool fitted with a $4^{th}$-axis rotary table 31, providing rotation about the axis 32. FIG. 15 shows a 5-axis vertical machine tool which incorporates a $4^{th}/5^{th}$-axis tilting/rotary table 33 providing orientation about $4^{th}$ axis 34 and rotation about the $5^{th}$ axis 35. FIG. 16 shows a 4-axis horizontal machine tool which incorporates a $4^{th}$-axis rotary table 36 providing rotation about the axis 37.

Figure 17:
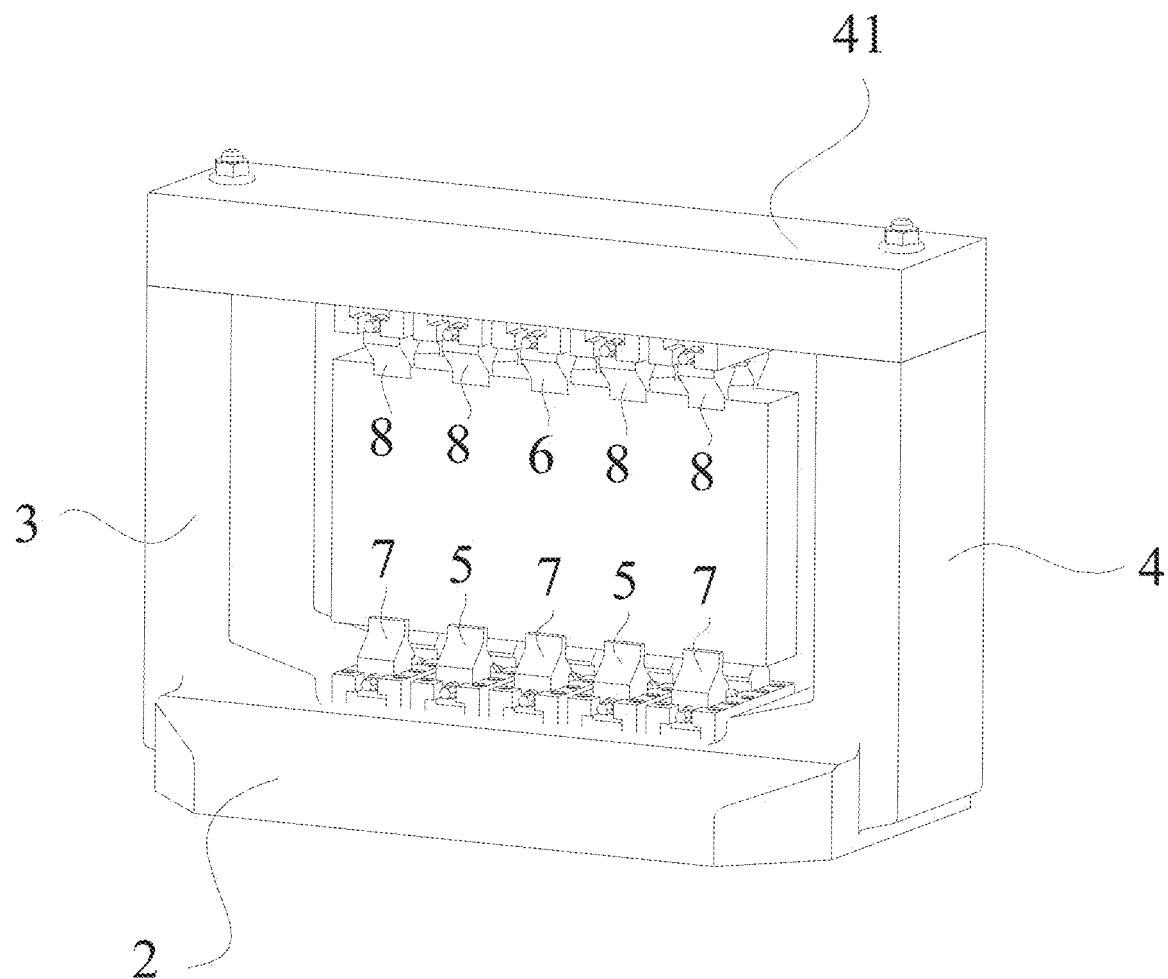
FIG. 17 is a schematic diagram of a second embodiment of the invention.

FIG. 17 is a schematic diagram of a clamp 1 according to a second embodiment of the invention. For ease the same reference numerals are used to refer to the components of the second embodiment as are used to refer to the components of the first embodiment.

The clamp 1 of the second embodiment comprises a base 2, a first arm 3, a second arm 4, a top bar 41, and a set of opposed vices 5, 6, 7, 8 mounted at opposing faces of the base and the top bar. The set of opposed vices consist of two self-centering vices 5 mounted at an inner face of the base 2, one self-centering vice 6 mounted at an inner face of the top bar 41, three floating vices 7 mounted at the inner face of the base 2, and four floating vices 8 mounted at the inner face of the top bar 41. The vices 5, 6, 7, 8 are evenly vertically spaced along each of the base 2 and the top bar 41.

As can be seen in the Figure the self-centering vice 6 of the top bar 41 is the central vice of the five vices 6, 8 mounted thereat. The self centering vices 5 of the base 2 are the second and fourth of the five vices 5, 7 mounted thereat. The top bar 41 is removably fixed to outer ends of the first arm 3 and the second arm 4. Unlike the first embodiment of the invention, the first arm 3 and the second arm 4 are not movable relative to the base 2 but are instead fixed in position in the base 2. Together, the base 2, first arm 3, second arm 4, and the top bar 41 form a closed frame within which a workpiece 12 can be held.

The second embodiment of the invention is operated in the following manner. A workpiece 12 is positioned within the clamp 1 whilst the top bar 41 is removed from the clamp 1 such that the workpiece is positioned within the clamps 5, 7 mounted at the base 2. The top bar 41 is then fixed to the outer ends of the first arm 3 and the second 4 such that the workpiece is positioned within the vices 6, 8 mounted thereat. The vices 5, 6, 7, 8 are tightened to hold the workpiece 12 in place. The vices 5, 7 mounted at the base 2 may be tightened before or after the top bar is fixed in position. After the workpiece 12 is held in place it may then be machined.

It will be understood that the embodiments of the invention shown in the Figures are not intended to be limiting upon the scope of the invention. Rather, the embodiments shown in the Figures is intended to be illustrative of various features of the invention that, in accordance with the claims, may or may not be present in a clamp according to the present invention. Unless otherwise stated in the claims any individual feature of the embodiments shown in the Figures may or may not be present in any embodiments of the invention, either in isolation or in combination with any other feature. Further, various features are shown in detail in the Figures but the scope of the invention is not intended to be limited to that detail or specific implementation of the feature. Rather, unless otherwise stated in the claims, any such feature may be implemented in any manner apparent to the person skilled in the art.

The invention claimed is:

1. A clamp for holding a workpiece for machining, the clamp comprising: a frame comprising a base, a first arm, and a second arm, the first arm and the second arm each mounted to the base at an inner end such that they are parallel with one another; a set of opposed vices mounted at inner faces of the first and the second arms to hold the workpiece therebetween, the set of opposed vices comprise three self-centering vices, two of the self-centering vices mounted at the inner face of the first arm and one of the self-centering vices mounted at the inner face of the second arm.

2. The clamp according to claim 1, further comprising at least one floating vice mounted on the inner face of the first or the second arm.

3. The clamp according to claim 2, wherein the at least one floating vice comprises three or more floating vices including at least one mounted at the first arm and at least two mounted at the second arm.

4. The clamp according to claim 2, wherein the set of opposed vices comprise five vices mounted at the inner face of the first arm and five vices mounted at the inner face of the second arm.

5. The clamp according to claim 2, wherein the self-centering vice mounted on the second arm is the central vice mounted on the inner face of the second arm.

6. The clamp according to claim 1, wherein the frame is a closed frame and comprises a top bar mounted to an outer end of the first arm and an outer end of the second arm and extending therebetween.

7. The clamp according to claim 6, wherein the top bar is removable.

8. The clamp according to claim 1, wherein the frame is an open frame consisting of the base, the first arm.

9. The clamp according to claim 8, wherein the first arm and the second arm are mounted to the base such that they are movable towards and apart from one another.

10. The clamp according to claim 8, wherein the first arm and the second arm are mounted in the base by means of a dovetail mount.

11. The clamp according to claim 10, wherein the clamp further comprises a screwed wedge for clamping the first arm or the second arm in the dovetail mount.

12. The clamp according to claim 8 further comprising a positioning screw extending through the base, the first arm, and the second arm for moving the first arm and the second arm towards and apart from one another.

13. The clamp according to claim 12, wherein the positioning screw comprises a left-hand thread portion for moving the first or the second arm, and a right-hand thread portion for moving the other of the first or the second arm; and the left-hand thread portion and the right-hand thread portion are joined centrally between the first arm and the second arm such that rotating the positioning screw moves the first arm and the second arm in opposing directions.

14. The clamp according claim 1, further comprising: a support mounted on the base between the first arm and the second arm for supporting an inner side of a workpiece supported between the first and second arms when the workpiece is supported in a substantially vertical position.

15. The clamp according to claim 1 further comprising adjustable support means formed at an inner end of the first arm or at an inner end of the second arm for supporting a workpiece supported in a substantially vertical position between the first and second arms.

16. The clamp according to claim 15, wherein the adjustable support means comprises a support plate that can be bolted to the inner end of the first arm or the inner end of the second arm.

17. The clamp according to claim 16, wherein the support plate can be bolted in a plurality of different positions for supporting workpieces of different sizes.

18. A method of machining a workpiece using a clamp according to claim 2 comprising the sequential steps of: fixing the clamp to a machine platform of a machine; positioning the workpiece in the clamp such that a first edge is positioned within arms of the self-centering vices and the floating vices of the inner face of the first arm and a second opposing edge is positioned within arms of the self-centering vice and any floating vices of the inner face of the second arm; tightening the self-centering vices of the clamp onto the workpiece; tightening the floating vices of the clamp onto the workpiece; and machining the workpiece.

19. A method of machining a workpiece using a clamp according to claim 3 comprising the sequential steps of: fixing the clamp to a machine platform of a machine and positioning the first arm and the second arm of the clamp a distance apart; positioning the workpiece in the clamp such that a first edge is positioned within arms of the self-centering vices and any floating vices of the inner side of the first arm and a second opposing edge is positioned within arms of the self-centering vice and any floating vices of the inner side of the second arms; tightening the self-centering vices of the clamp onto the workpiece; tightening the floating vices of the clamp onto the workpiece; and machining the workpiece.

* * * * *